(12) United States Patent
Komiyama et al.

(10) Patent No.: US 7,651,556 B2
(45) Date of Patent: Jan. 26, 2010

(54) TREATING AGENT FOR FORMING A PROTECTIVE COATING AND METALLIC MATERIALS WITH A PROTECTIVE COATING

(75) Inventors: Shinobu Komiyama, Tokyo (JP); Yugo Tsuiki, Tokyo (JP); Akihiro Seo, Tokyo (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 559 days.

(21) Appl. No.: 10/765,322

(22) Filed: Jan. 26, 2004

(65) Prior Publication Data

US 2004/0156995 A1 Aug. 12, 2004

Related U.S. Application Data

(63) Continuation of application No. PCT/JP02/07380, filed on Jul. 22, 2002.

(30) Foreign Application Priority Data

Aug. 17, 2001 (JP) ............................. 2001-248288

(51) Int. Cl.
*C09D 1/02* (2006.01)
*C09D 1/04* (2006.01)
*C10M 103/00* (2006.01)
*C10M 173/00* (2006.01)

(52) U.S. Cl. .............. 106/14.44; 106/14.11; 106/14.13; 106/14.14; 106/14.22; 106/14.23; 106/14.24; 106/14.25; 106/14.26; 106/14.27; 106/14.28; 106/14.34; 106/14.35; 106/14.39; 106/14.41; 106/620; 106/621; 106/622; 106/626; 106/632; 106/634

(58) Field of Classification Search .............. 106/14.11, 106/14.13, 14.14, 14.22, 14.23, 14.24, 14.25, 106/14.26, 14.27, 14.28, 14.34, 14.35, 14.39, 106/14.41, 14.44, 620, 621, 622, 626, 632, 106/634

See application file for complete search history.

(56) References Cited

U.S. PATENT DOCUMENTS

| | | | | |
|---|---|---|---|---|
| 3,735,797 A | * | 5/1973 | Jeanneret | 164/72 |
| 3,836,467 A | * | 9/1974 | Jones | 508/143 |
| 4,116,851 A | * | 9/1978 | Rupe et al. | 134/25.2 |
| 4,130,440 A | * | 12/1978 | Nose et al. | 106/627 |
| 4,169,916 A | * | 10/1979 | Tsutsui et al. | 428/447 |
| 4,227,932 A | * | 10/1980 | Leah et al. | 106/630 |
| 4,347,285 A | * | 8/1982 | Batdorf | 428/332 |
| 4,403,059 A | * | 9/1983 | Laut et al. | 524/399 |
| 5,069,809 A | * | 12/1991 | Lagerwaard et al. | 510/305 |
| 5,358,554 A | * | 10/1994 | Seymour et al. | 106/2 |
| 6,821,631 B2 | * | 11/2004 | Grantham et al. | 428/453 |

FOREIGN PATENT DOCUMENTS

| | | |
|---|---|---|
| JP | 04-01798 | 1/1992 |
| JP | 05-07969 | 1/1993 |
| JP | 06-57441 | 3/1994 |
| JP | 10-130861 | 5/1998 |
| JP | 10-217394 A | 8/1998 |
| JP | 2000-63880 | 2/2000 |

* cited by examiner

*Primary Examiner*—Anthony J Green
(74) *Attorney, Agent, or Firm*—Mary K. Cameron

(57) ABSTRACT

A protective coating is formed on a metallic material surface by applying a treating agent comprising water, an alkali silicate, and, optionally, a lubricating component to the surface and drying the treating agent. The coating film thereby formed has excellent anti-galling and rust preventive properties. If a lubricating component is present, the coating film also has excellent self-lubricating properties.

26 Claims, No Drawings

TREATING AGENT FOR FORMING A PROTECTIVE COATING AND METALLIC MATERIALS WITH A PROTECTIVE COATING

This application is a continuation under 35 USC Sections 365(c) and 120 of International Application No. PCT/JP02/07380, filed 22 Jul. 2002 and published 3 Apr. 2003 as WO 03/027188, which claims priority from Japanese Application No. 2001-248288, filed 17 Aug. 2001, each of which is incorporated herein by reference in its entirety.

BACKGROUND OF THE INVENTION

1. Field of the Invention

The present invention pertains to a treating agent for forming a protective coating, metallic materials that have a protective coating, and a method for forming a protective coating. In more detail, the present invention pertains to a treating agent for forming a protective coating with excellent workability and galling resistance, also heat resistance to working heat, and a rust-preventive property on the surfaces of metallic materials that require cold plastic working; to metallic materials that have a protective coating; and to a method for forming a protective coating, and can be used by applying a lubricating component on the surface of the coating or by incorporating it in the coating, thereby providing the lubricity necessary for working.

2. Discussion of the Related Art

In the cold plastic working of metallic materials as typified by forging, wire drawing, and pipe extraction and drawing, a protective coating layer is formed on the surface of a workpiece for the purpose of preventing galling between the workpiece and the tool being used. The primary function of the protective coating layer is to prevent direct metallic contact between the workpiece surface and tool surface; strong adhesion of the protective coating to the surface of the metallic material and the ability of the protective coating to follow expansion of the surface area during plastic working are considered to be particularly important. Furthermore, a lubricating component is applied on the protective coating layer or incorporated within it, so as to reduce the coefficient of friction with the tool surface and to ease the load on the coating layer itself and the generation of working heat, thus actually reducing the working energy.

Conventional techniques for forming such a protective coating layer include various techniques that have been investigated many times in the past. The methods that have typically been used include the direct formation of a coating film consisting mainly of a lubricating component, such as an oil, soap, metallic soap, or wax film, and the formation of a reactive chemical conversion coating layer, such as a phosphate or oxalate film, on the surface of a metal, and finally the formation of a lubricating component film. The former has advantages such as fewer treatment steps and simple and easy control of the solution, because the coating can be obtained by applying the lubricating component singly or, if needed, together with a binder component on the surface of a workpiece, followed by drying. However, these coatings do not adhere sufficiently to the workpiece surface, and more importantly, cannot follow the expansion of the surface area of the material in areas that are intensely worked, which means that extremely thinned-out film areas or broken film areas develop, and accordingly, in many cases, the resulting protective film function is insufficient and/or cannot be maintained.

In the latter method, on the other hand, a compact reactive chemical conversion coating layer is formed on the workpiece surface, thereby providing strong adhesion to the material surface, and also exhibiting a sufficient "following" property with respect to the expansion of the surface area during intense working. Furthermore, the adhesion and retention of a metallic soap layer that is formed by a reaction with the surface layer of the chemical conversion coating layer, and a sodium soap layer as the lubricating component of the topmost layer are secured, the latter through the surface roughness, so that work energy is actually reduced considerably. However, because the chemical conversion coating is formed by a chemical reaction, complicated treatment solution control and many steps are required, and in addition, the costs required are extremely high if wastewater treatment and facility investment are included. Moreover, a heavy load is placed on the global environment, because industrial waste, such as chemically produced sludge, is produced in large quantities. In addition, the chemical reactivity differs considerably, depending on the object material, hence the latter method has another drawback in that it is difficult to apply to difficult-to-convert materials that exhibit poor chemical reactivity.

To solve these problems, effort has been expended to improve the performance of protective coatings by the former method to a degree that is comparable to that of a chemical conversion treatment. As a result of these efforts, methods using oil-based lubricating agents or water-based lubricating agents have been proposed. Japanese Patent Kokoku No. 4[1992]-1,798 discloses the following oil-based lubricating agents: lubricating agents for cold working prepared by adding metallic soap or solid lubricants to lubricating oils, which are prepared by mixing extreme-pressure agents such as chlorinated paraffins or phosphates, copolymers of isobutylene and n-butene, and animal and plant oils. However, even these high-performance lubricating agents present some problems related to workability when compared with a lubricating process where reactive soap lubrication is applied after chemical conversion film formation, and thus there can be drawbacks such as the generation of foul odors during working and the contamination of oil systems, because of the use of extreme-pressure additives, while a cleaner environments is called for in workplaces such as the sites at which the actual working is carried out.

Recent techniques for aqueous lubricants that have been disclosed include lubricant compositions for the plastic working of metallic materials containing synthetic resins and water-soluble inorganic salts in specified ratios (Japanese Patent Kokai 2000-63,880). These techniques are used for the purpose of avoiding direct metallic contact with a tool by forming a coating film with a uniformly precipitated synthetic resin and water-soluble inorganic salt on the surface of a workpiece, followed by the incorporation of a lubricating component in the coating in any desired ratio, and are thus supposed to provide performance properties that are comparable or superior to those of a phosphate coating on which a lubricating component layer is formed.

However, by and for themselves, these coatings bear two functions, namely, an anti-galling property and a lubricating property, and in practical terms are often applied for a barrier effect to protect the material surface from corrosion before and after working, but they are actually extremely poor in rust-preventive property when compared with a combination of a phosphate coating and a lubricating component layer, mainly because the amount of coating remaining on the material is sharply reduced after working.

BRIEF SUMMARY OF THE INVENTION

The goal of the present invention is to solve the problems of the above-mentioned conventional techniques. In other words, the present invention is aimed at providing a treating agent for forming a protective coating, which can substantially reduce complicated treatment solution control, which can reduce the number of steps required, and which can reduce the load from wastewater treatment or industrial waste; which can form a coating with excellent anti-galling and rust-preventive properties comparable or superior to those of a coating formed by the chemical conversion process, by means of a simple and easy method wherein the treating agent is deposited by dipping or spraying and then dried; and which can confer an excellent self-lubricating property to the coating obtained when a lubricating component is further applied on the protective coating or incorporated therein, while being a water-based agent; metallic materials that have a protective coating; and a method for forming a protective coating.

The present inventors carried out extensive studies that were directed at achieving the above-mentioned object, and as a result found that a coating film with excellent anti-galling and rust-preventive properties comparable or superior to those of a coating formed by the chemical conversion process can be formed by a simple and easy method, wherein a treating agent for forming a protective coating prepared by adding a specified alkali silicate to water is applied on a metallic material and then dried. Furthermore, it was found that applying a lubricating component on the protective coating or incorporating it into the coating can confer an excellent self-lubricating property to the coating film obtained. The present invention was developed as a result of these discoveries.

Specifically, the present invention pertains to a treating agent for forming a protective coating, prepared by adding an alkali silicate, as represented by the formula $M_2O.nSiO_2$ [wherein n represents a number from 2 to 9, and M represents at least one of Na, K, Li, and $NR_4$ (wherein R independently represents a hydrogen atom or an alkyl group)], to water. A coating film that can be obtained by a treating agent such as this exhibits excellent anti-galling and rust-preventive properties when used as an undercoat of a conventional lubricating film consisting of oil, soap, metallic soap, or wax. Furthermore, at least one lubricating component selected from among oil, soap, metallic soap, wax, and polytetrafluoroethylene is added as a lubricating component, to yield a protective coating with self-lubricating property, in which case the amount added is 1 to 90 mass % on the basis of the total mass of alkali silicate plus lubricating component (where the amount of alkali silicate added is 10 to 99 mass %). In addition, the present invention pertains to metallic materials with a protective coating, characterized in that a protective coating formed by the above-mentioned treating agent for forming a protective coating, is formed on said metallic materials. Metallic materials with a protective coating such as this can be obtained by applying the above-mentioned treating agent on the metallic materials and then drying; the coating weight of the protective coating to be deposited is preferably 0.3 to 50 $g/m^2$. The present invention further pertains to a method for forming a protective coating, characterized in that the above-mentioned treating agent is applied on the surface of a metallic material.

DETAILED DESCRIPTION OF CERTAIN EMBODIMENTS OF THE INVENTION

The alkali silicate represented by the aforesaid formula to be used in the treating agent for forming a protective coating of the present invention is an essential film component in the treating agent of the present invention, and serves to impart the function of preventing direct metallic contact between a workpiece and a tool, and the function of retaining other components as well as the lubricating component in the coating film, and at the same time serves to provide an excellent rust-preventive property as well, through the formation of a strong continuous film on the metal surface. Furthermore, because the melting point of a coating consisting of an alkali silicate is far higher than the final material temperature attained in cold plastic working, a lubricating coating layer based on this compound is less susceptible to working heat and can exhibit the above-mentioned functions in a stable manner.

In alkali silicates represented by the aforesaid formula, R is preferably a hydrogen atom or an alkyl group with 1 to 4 carbon atoms, and more preferably a hydrogen atom, a methyl group, or an ethyl group.

The alkali silicate to be used in the treating agent for forming a protective coating of the present invention should be used in the form of an aqueous solution typically consisting of silicon dioxide and an alkali metal oxide. The reason why these alkali silicates can exist stably in solution is thought to be that the hydrated $M^+$ obstructs the condensation of silicate ions with OH, and the larger the $M_2O$ content, the more easily soluble in water and the more stable as an aqueous solution. In the present invention, however, the $SiO_2/M_2O$ molar ratio must be in the range of 2 to 9, in order for the alkali silicate to form a glassy film; if this ratio is less than 2, sufficient strength as a protective coating cannot be provided, and if it is larger than 9, the stability as an aqueous solution deteriorates a great deal and hence a difficulty arises in producing an aqueous treating agent for forming a protective coating. Here, the above-mentioned $SiO_2/M_2O$ molar ratio is not limited to an integer, but may be a numerical value including figures following the decimal point, as long as it within the range of 2 to 9.

Specific examples of alkali silicates for use in the present invention include sodium silicate and potassium silicate with $SiO_2/M_2O$ molar ratios of 2 to 4, lithium silicate with $SiO_2/M_2O$ molar ratios of 3.5 to 8.5, and ammonium silicate with $SiO_2/M_2O$ molar ratios of 3 to 9, but if the stability of the aqueous solution and film formability are taken into consideration, sodium silicate and potassium silicate work especially well, and furthermore an $SiO_2/M_2O$ molar ratio of 2 to 4 is preferred.

Alkali silicates for use in the present invention can be used either singly or in combinations of two or more, as long as the above-mentioned $SiO_2/M_2O$ molar ratios are satisfied as a whole.

The aqueous treating agent for forming a protective coating of the present invention may contain a lubricating component if needed, and usually it is desirable to incorporate it in said treating agent. Preferred lubricating components suitable for this purpose are materials that are stable in aqueous solution and do not reduce the film strength. Examples of such materials include soap, metallic soap, wax, polytetrafluoroethylene, and oil. Specifically, soap includes, for example, sodium stearate and potassium stearate; metallic soap includes, for example, calcium stearate, aluminum stearate, barium stearate, lithium stearate, and zinc stearate; wax includes, for example, polyethylene wax, polypropylene wax, carnauba wax, beeswax, and paraffin wax; and polytetrafluoroethylene includes polytetrafluoroethylene with degrees of polymerization of, for example, about 1,000,000 to 10,000,000. Furthermore, oils such as plant oils, mineral oils, and synthetic oils can be used; for example, plant oils include palm oil, castor oil, and rape oil, mineral oils include machine oil, turbine oil, and spindle oil, and synthetic oils include ester oils and silicone oil. It is suitable to incorporate these in the invention composition by mixing them with the other components in the form of aqueous dispersions or aqueous emulsions. The lubricating component is usually dispersed or emulsified in the aqueous treating agent of the present invention.

Lubricating components for use in the present invention can be used either singly or in combinations of two or more.

When a lubricating component is incorporated in the aqueous treating agent for forming a protective coating of the present invention, it is desirable to adjust the amount of lubricating component being added to 1 to 90 mass % (10 to 99 mass % for alkali silicate), and more desirable to 5 to 85 mass % (15 to 95 mass % for alkali silicate), based on the total mass of alkali silicate and lubricating component. If the amount added is less than 1 mass %, the friction of the coating film increases, and galling occurs more easily when the treating agent is used singly as a self-lubricating coating; and with more than 90 mass % the adhesion and strength of the coating film decrease. However, when oil or some other lubricating agent is applied on top of a coating film consisting of the aqueous composition of the present invention, a good anti-galling property and corrosion resistance are exhibited, even if no lubricating agent at all is contained in the coating.

Further, the alkali silicate is typically used in the form of an aqueous solution and the lubricating component is typically used in the form of an aqueous dispersion or aqueous emulsion, but the amounts of the two added in the above-mentioned case are the values with respect to the alkali silicate and lubricating component themselves, in which case water is not taken into account. The same can be said for the admixed amount of the viscosity modifier mentioned below.

Since the aqueous treating agent for forming a protective coating of the present invention is used as a coating-type chemical, a viscosity modifier can be incorporated with a view to improving coatability. The amount of viscosity modifier can be 1 to 30 mass %, preferably 1 to 10 mass %, and more preferably 2 to 5 mass %, based on the total mass of alkali silicate and lubricating component (the mass of alkali silicate when no lubricating component is added). When more than 30 mass % is added, the strength of the coating drops sharply, and when less than 1 mass % is added, the effect of compounding cannot be attained.

Viscosity modifiers that confer thixotropy to the treatment solution and accelerate the formation of a uniform film can also be used, apart from those that only increase the viscosity of the existing treating agent. In more concrete terms, organic polymer thickeners such as hydroxyethylcellulose, carboxymethylcellulose, polyacrylamide, sodium polyacrylate, polyvinylpyrrolidone, and polyvinyl alcohol, and inorganic thickeners such as finely powdered silica, bentonite, kaolin, and synthetic hectorite can be used. These viscosity modifiers can be used singly or in combinations of two or more.

To improve working performance, a sold lubricant such as graphite, molybdenum disulfide, boron nitride, fluorinated graphite, or mica, and an extreme-pressure additive such as an olefin sulfide, a sulfide ester, a sulfite, a thiocarbonate, a chlorinated fatty acid, a phosphate ester, a phosphite ester, molybdenum dithiocarbamate (MoDTC), molybdenum dithiophosphate (MoDTP), or zinc dithiophosphate (ZnDTP) can also be added to the treating agent for forming a protective coating of the present invention.

The total concentration of components in the treating agent for forming a protective coating of the present invention, excluding a solvent or a dispersion medium which is usually water, is not particularly critical, but generally concentrations of about 1 to 35 mass % are suitable.

The metallic materials with the protective coating of the present invention refer to those that can be obtained by applying the above-mentioned aqueous treating agent on the surfaces of metallic materials such as iron or steel, copper or copper alloys, aluminum or aluminum alloys, and titanium or titanium alloys, and then drying. The protective coating of the present invention greatly improves workability and the anti-galling property when the metallic materials are subjected to cold plastic working (wire drawing, tube drawing, forging, etc.), and also provides the worked materials with an excellent rust preventive property. The shape of the metallic materials with the protective coating of the present invention is not particularly restricted, because not only base materials such as bars and blocks can be treated but also shaped products (gears, shafts, etc.) after hot forging. Prior to applying the aqueous treating agent for forming a protective coating of the present invention, it is desirable to carry out pretreatments comprising degreasing (usually an alkali degreaser can be used) of a metallic material to be worked, rinsing, pickling (using an acid such as hydrochloric acid to remove oxide scales of the metallic material and to enhance the adhesion of the coating film), and rinsing, in that order, to clean the surface in advance, so as to enhance the adhesion of the protective coating of the present invention. When there are no oxide scales sticking to the surface, pickling→rinsing may be omitted. It is sufficient to carry out these pretreatments according to conventional methods.

The treating agent of the present invention is applied by conventional methods such as dipping, spraying, pouring-over, or electrostatic coating. For coating purposes, it is sufficient to cover the metal surface thoroughly with the aqueous treating agent, and the coating time is not particularly critical. After coating, the aqueous treating agent must be dried. Drying may be accomplished by simply letting the coated item stand at ordinary temperatures, but usually it is suitable to dry the item at 60 to 150° C. for 1 to 30 minutes. It is desirable for the coating mass after application and drying of the protective coating of the present invention to be 0.3 $g/m^2$ or more from the standpoint of preventing galling and providing corrosion resistance, and to be no more than 50 $g/m^2$ from the cost standpoint. Furthermore, to further exhibit the effect of the present invention in a stable manner, coating masses of 1 to 30 $g/m^2$ are preferred.

When the treating agent of the present invention being applied on a metallic material contains a lubricating component, excellent lubricity can be imparted to the metallic material surface, in addition to an excellent anti-galling property and excellent rust-preventive property. When the treating agent of the present invention being applied on a metallic material contains no lubricating component, an excellent anti-galling property and excellent rust-preventive property can nevertheless be imparted to the metallic material surface, and the application of at least one lubricating component selected from among the above-mentioned soap, metallic soap, wax, polytetrafluoroethylene, and oil on the dried coating (i.e., after drying the coating), can further impart excellent lubricity as well. This lubricating component can usually be applied by melting the lubricating component first and then applying it on the dried coating.

EXAMPLES

Actual examples of the present invention will now be given together with comparison examples to illustrate the present invention together with its effect in more concrete terms.

"Following" Property

Spike test working based on the invention of Japanese Patent Kokai No. 5[1993]-7,969 was carried out and the extent of "following" of the coating remaining on the protruding part of the worked test specimen was evaluated by visual inspection. The samples with a good following property were judged as having a sufficient anti-galling property to suitably deal with the expansion of the surface area during cold plastic working.

Test Specimen: The material provided for the spike test was S45C spheroidized annealed material of the type sold on the market, and the test specimen measured 25 mm in diameter and 30 mm in height.

Evaluation Criteria:
A: coating followed to the top of the protrusion
B: coating followed to the middle of the protrusion
C: coating followed to the lower part of the protrusion
D: coating did not follow in the protruding part Rust Preventive Property The oil component that remained stuck to the surface of the test specimens after the above-mentioned spike test working was wiped off with diethyl ether; the test specimens were exposed to the outdoor atmosphere for 6 months, and then the extent of rust formation was evaluated by visual inspection. The evaluation criteria are shown below.

o: no rust formation seen
Δ: rust formation seen in some portions
x: rust formation seen all over Actual Examples 1-7, Comparison Examples 1-4

Treatments were carried out according to the following treatment processes:

(1) Degreasing: a commercial degreaser was used (registered trademark, Fine Cleaner 4360, produced by Nihon Parkerizing (Ltd.)); concentration 20 g/L, temperature 60° C., dipping 10 minutes (2) Rinsing: tap water, 60° C., dipping 10 seconds (3) Surface Treatment: various treating agents, 60° C., dipping 10 seconds (4) Drying: 80° C., 3 minutes Comparison Example 5

Treatments were carried out according to the following treatment processes:

(1) Degreasing: a commercial degreaser was used (registered trademark, Fine Cleaner 4360, produced by Nihon Parkerizing (Ltd.)); concentration 20 g/L, temperature 60° C., dipping 10 minutes (2) Rinsing: tap water, room temperature, dipping 30 seconds (3) Chemical Conversion Treatment: a commercial zinc phosphate chemical conversion agent was used (registered trademark, Parbond 181X, produced by Nihon Parkerizing (Ltd.)), concentration 90 g/L, temperature 80° C., dipping 5 minutes ※ Target Coating Weight=5 g/m$^2$ (4) Rinsing: tap water, room temperature, dipping 30 seconds (5) Soap Treatment: a commercial reactive soap lubricant was used (registered trademark, Palube 235, produced by Nihon Parkerizing (Ltd.)), concentration 70 g/L, 80° C., dipping 10 minutes ※ Coating Weight=3 g/m$^2$ (6) Drying: 80° C., 3 minutes The results of the above-mentioned test are shown in Table 1. As is clear from Table 1 Actual Examples 1-7 using the aqueous compositions for forming a protective coating of the present invention showed an excellent following property upon working and were provided by a simple and easy process, hence these samples were presumed to have good anti-galling function, and moreover had a good corrosion preventive property. On the other hand, Comparison Example 1, where the SiO$_2$/M$_2$O molar ratio was outside the scope of the present invention, and Comparison Example 2, where the mass ratio of alkali silicate was outside the scope of the present invention, exhibited a poor "following" property upon working, and Comparison Examples 3 and 4, where only inorganic salts other than an alkali silicate were used, were poor in corrosion preventive property. The test specimen treated with reactive soap on the phosphate coating of Comparison Example 5 showed lubricating property approximately equaling that of the present invention, but this treatment cannot be used in simple facilities because it requires wastewater treatment and solution control, and also gives an environmentally heavy load because it produces waste associated with the reaction, hence it is not intended by the invention.

TABLE 1

ACTUAL EXAMPLES 1-7 AND COMPARISON EXAMPLES 1-5.

| | Composition of Treating Agent for Forming a Protective Coating | | | | | | | | Evaluation Results | |
|---|---|---|---|---|---|---|---|---|---|---|
| | Alkali Silicate | SiO$_2$/ M$_2$O *1 | Amt. Added (%) *2 | Lubricating Component | Amt. Added (%) *2 | Other | Amt. Added (%) *7 | Coating Weight (g/m$^2$) | "Following" Property on Working | Rust Preventative Property |
| Actual example 1 *3 | sodium silicate | 2 | 100 | | 0 | — | — | 1 | B | o |
| Actual example 2 *3 | | 3 | 95 | sodium stearate | 5 | — | — | 1 | A | o |
| Actual example 3 | | 3 | 95 | palm oil | 5 | HEC *5 | 3 | 3 | B | o |
| Actual example 4 | | 4 | 74 | paraffin wax | 26 | CMC *4 | 5 | 40 | A | o |

TABLE 1-continued

ACTUAL EXAMPLES 1-7 AND COMPARISON EXAMPLES 1-5.

| | Composition of Treating Agent for Forming a Protective Coating | | | | | | | Evaluation Results | |
|---|---|---|---|---|---|---|---|---|---|
| | Alkali Silicate | $SiO_2/M_2O$ *1 | Amt. Added (%) *2 | Lubricating Component | Amt. Added (%) *2 | Other | Amt. Added (%) *7 | Coating Weight (g/m$^2$) | "Following" Property on Working | Rust Preventative Property |
| Actual example 5 | potassium silicate | 2 | 50 | barium stearate | 56 | — | — | 15 | B | ○ |
| Actual example 6 | | 3 | 82 | polyethylene wax | 18 | HEC *5 | 2 | 20 | A | ○ |
| Actual example 7 | lithium silicate | 8 | 15 | sodium stearate | 85 | HEC *5 | 2 | 7 | B | ○ |
| Comparison example 1 | sodium silicate | 1 | 50 | calcium stearate | 50 | — | — | 10 | C | Δ |
| Comparison example 2 | | 3 | 5 | polyethylene wax | 95 | CMC *4 | 5 | 15 | C | Δ |
| Comparison example 3 *3 | potassium sulfate | — | 95 | sodium stearate | 5 | — | — | 2 | A | X |
| Comparison example 4 | sodium borate | — | 71 | polyethylene wax | 29 | HEC *5 | 2 | 20 | B | X |
| Comparison example 5 | zinc phosphate treatment + reactive soap lubrication treatment | | | | | | | 5 + 3 | A | Δ |

*1 Shows the molar ratio.
*2 Each composition shows the mass ratio of alkali silicate to lubricating component.
*3 The spike test was conducted by applying a coating of 5 g/m$^2$ of oil-based lubricant FL-4675 produced by Nihon Parkerizing (Ltd.).
*4 carboxymethylcellulose (viscosity modifier)
*5 synthetic hectorite, $Na^{+7}[(Si_8Mg_{5.5}Li_{0.3})O_{20}(OH)_4]^{-0.7}$ (viscosity modifier)
*6 polytetrafluoroethylene
*7 mass ratio when the mass of (alkali silicate + lubricating component) in the coating is given as 100

As is apparent from the above-mentioned explanation, the aqueous treating agent for forming a protective coating of the present invention can be used to apply a protective coating on the surface of a metallic material by a simple and easy method, wherein the treating agent is applied to the target metal surface and dried. The metallic material with this protective coating is of a level suitable for practical use, and has an anti-galling property comparable to that of conventional phosphate-treated steel material, and also a good rust preventive property. In addition, little waste is produced and the work environment is good, hence the present invention is extremely valuable for use in industry.

What is claimed is:

1. A treating agent for forming a protective coating, comprising:
   an alkali silicate, as represented by the formula $M_2O \cdot nSiO_2$ [where n represents a number of 2 to 9, and M represents at least one of Na, K, Li, and $NR_4$ (where R independently represents a hydrogen atom or an alkyl group)] in an amount of 15-95 mass % based on the total mass of alkali silicate and lubricating component;
   at least one lubricating component selected from among soaps, metallic soaps, waxes, and polytetrafluoroethylenes in an amount of 5-85 mass % based on the total mass of alkali silicate and lubricating component;
   at least one viscosity modifier in an amount of 1 to 10 wt % based on the total mass of alkali silicate and lubricating component;
   and water;
   wherein the at least one viscosity modifier comprises at least one inorganic thickener selected from the group consisting of finely powdered silica, bentonite, kaolin, and synthetic hectorite.

2. A treating agent for forming a protective coating according to claim 1, wherein the alkali silicate is at least one selected from the group consisting of sodium silicates and potassium silicates with $SiO_2/M_2O$ molar ratios of 2 to 4, lithium silicates with $SiO_2/M_2O$ molar ratios of 3.5 to 8.5, and ammonium silicates with $SiO_2/M_2O$ molar ratios of 3 to 9.

3. A treating agent for forming a protective coating according to claim 1, comprising at least one soap selected from the group consisting of sodium stearate and potassium stearate.

4. A treating agent for forming a protective coating according to claim 1, comprising at least one metallic soap selected from the group consisting of calcium stearate, aluminum stearate, barium stearate, lithium stearate, and zinc stearate.

5. A treating agent for forming a protective coating according to claim 1, comprising at least one wax selected from the group consisting of polyethylene wax, polypropylene wax, carnauba wax, beeswax, and paraffin wax.

6. A treating agent for forming a protective coating according to claim 1, wherein the at least one viscosity modifier further comprises organic polymer-based thickeners.

7. A treating agent for forming a protective coating according to claim 1, wherein the at least one viscosity modifier further comprises at least one organic polymer-based thickener selected from the group consisting of hydroxyethylcellulose, carboxymethylcellulose, polyacrylamide, sodium polyacrylate, polyvinylpyrrolidone, and polyvinyl alcohol.

8. A treating agent for forming a protective coating according to claim 1, additionally comprising at least one substance selected from the group consisting of solid lubricants and extreme-pressure additives.

9. A treating agent for forming a protective coating, comprising:
   an alkali silicate, as represented by the formula $M_2O \cdot nSiO_2$ [where n represents a number of 2 to 9, and M represents at least one of Na, K, Li, and $NR_4$ (where R independently represents a hydrogen atom or an alkyl group)];
   at least one lubricating component selected from among soaps, metallic soaps, waxes, and polytetrafluoroethylenes;

at least one viscosity modifier in an amount of 1 to 10 wt % based on the total mass of alkali silicate and lubricating component;

and water;

wherein the at least one viscosity modifier is synthetic hectorite.

10. A treating agent for forming a protective coating, comprising at least alkali silicate selected from the group consisting of sodium silicates and potassium silicates with $SiO_2/M_2O$ molar ratios of 2 to 4, lithium silicates with $SiO_2/M_2O$ molar ratios of 3.5 to 8.5, and ammonium silicates with $SiO_2/M_2O$ molar ratios of 3 to 9, at least one lubricating component in dispersed, emulsified, or both dispersed and emulsified form selected from among soaps, metallic soaps, waxes, and polytetrafluoroethylenes, at least one viscosity modifier in an amount of 1 to 10 wt % based on the total mass of alkali silicate and lubricating component, said at least one viscosity modifier comprising at least one inorganic thickener selected from the group consisting of finely powdered silica, bentonite, kaolin, and synthetic hectorite; and water and wherein the amount of alkali silicate is 50 to 95 mass % and the amount of lubricating component is 5 to 50 mass % on the basis of the total mass of alkali silicate and lubricating component.

11. A treating agent for forming a protective coating according to claim 10, wherein the alkali silicate is at least one selected from the group consisting of sodium silicates and potassium silicates with $SiO_2/M_2O$ molar ratios of 2 to 4.

12. A treating agent for forming a protective coating according to claim 10, comprising at least one soap selected from the group consisting of sodium stearate and potassium stearate.

13. A treating agent for forming a protective coating according to claim 10, comprising at least one metallic soap selected from the group consisting of calcium stearate, aluminum stearate, barium stearate, lithium stearate, and zinc stearate.

14. A treating agent for forming a protective coating according to claim 10, comprising at least one wax selected from the group consisting of polyethylene wax, polypropylene wax, carnauba wax, beeswax, and paraffin wax.

15. A treating agent for forming a protective coating according to claim 10, wherein the at least one viscosity modifier further comprises organic polymer-based thickeners.

16. A treating agent for forming a protective coating according to claim 10, wherein the at least one viscosity modifier further comprises at least one organic polymer-based thickener selected from the group consisting of hydroxyethylcellulose, carboxymethylcellulose, polyacrylamide, sodium polyacrylate, polyvinylpyrrolidone, and polyvinyl alcohol.

17. A treating agent for forming a protective coating according to claim 10, wherein the at least one inorganic thickener is synthetic hectorite.

18. A treating agent for forming a protective coating according to claim 10, additionally comprising at least one substance selected from the group consisting of solid lubricants and extreme-pressure additives.

19. A treating agent for forming a protective coating according to claim 11, further comprising:

a viscosity modifier selected from hydroxyethylcellulose and carboxymethylcellulose in an amount of 2 to 5 wt % based on the total mass of alkali silicate and lubricating component; and at least one solid lubricant and/or extreme-pressure additive, wherein said solid lubricant is selected from the group consisting of graphite, molybdenum disulfide, boron nitride, fluorinated graphite, and mica and said extreme-pressure additive is selected from the group consisting of an olefin sulfide, a sulfide ester, a sulfite, a thiocarbonate a chlorinated fatty acid, a phosphate ester, a phosphite ester, molybdenum dithiocarbamate, molybdenum dithiophosphate, and zinc dithiophosphate.

20. A composition for forming a corrosion preventive protective coating, comprising:

an alkali silicate, as represented by the formula $M_2O.nSiO_2$, where n represents a number of 2 to 9, and M represents at least one of Na, K, Li, and $NR_4$, where R independently represents a hydrogen atom or an alkyl group in an amount of 15-95 mass % based on the total mass of alkali silicate and lubricating component;

at least one lubricating component, in an amount of 5 to 85 wt % based on the total mass of alkali silicate and lubricating component, selected from among oils, soaps, metallic soaps, waxes, and polytetrafluoroethylenes;

at least one viscosity modifier in an amount of 1 to 10 wt % based on the total mass of alkali silicate and lubricating component; and water;

wherein the at least one viscosity modifier comprises at least one inorganic thickener selected from the group consisting of finely powdered silica, bentonite, kaolin, and synthetic hectorite.

21. A composition for forming a corrosion preventive protective coating according to claim 20, comprising at least one organic polymer-based thickener selected from the group consisting of hydroxyethylcellulose, carboxymethylcellulose, polyacrylamide, sodium polyacrylate, polyvinylpyrrolidone, and polyvinyl alcohol.

22. A composition for forming a corrosion preventive protective coating according to claim 20, wherein the at least one inorganic thickener is synthetic hectorite.

23. A composition for forming a corrosion preventive protective coating according to claim 20, additionally comprising at least one substance selected from the group consisting of solid lubricants and extreme-pressure additives.

24. A composition for forming a corrosion preventive protective coating according to claim 20, wherein the alkali silicate is at least one selected from the group consisting of sodium silicates and potassium silicates with $SiO_2/M_2O$ molar ratios of 2 to 4.

25. A composition for forming a corrosion preventive protective coating according to claim 24, wherein the at least one lubricating component is selected from among oils, soaps, metallic soaps, and waxes.

26. A composition for forming a corrosion preventive protective coating according to claim 25, wherein the at least one lubricating component is selected from among soaps, metallic soaps, and waxes.

* * * * *